United States Patent
Applegate

(10) Patent No.: US 9,950,395 B2
(45) Date of Patent: Apr. 24, 2018

(54) MULTI-USE PIPE CLAMP

(71) Applicant: John Anderson Construction, Inc., Warren, PA (US)

(72) Inventor: Justin Applegate, Williamsport, PA (US)

(73) Assignees: John Anderson Construction, Inc., Warren, PA (US); Justin Applegate, Williamsport, PA (US)

( * ) Notice: Subject to any disclaimer, the term of this patent is extended or adjusted under 35 U.S.C. 154(b) by 0 days.

(21) Appl. No.: 15/270,315

(22) Filed: Sep. 20, 2016

(65) Prior Publication Data
US 2018/0079037 A1 Mar. 22, 2018

(51) Int. Cl.
| F16L 23/00 | (2006.01) |
| B23K 37/053 | (2006.01) |
| F16L 13/02 | (2006.01) |

(52) U.S. Cl.
CPC ......... *B23K 37/0533* (2013.01); *F16L 13/02* (2013.01)

(58) Field of Classification Search
CPC .......... F16L 23/036; F16L 23/08; F16L 23/10
USPC ......... 285/22, 410, 411, 408, 414, 415, 400, 285/404
See application file for complete search history.

(56) References Cited

U.S. PATENT DOCUMENTS

| 643,200 | A | * | 2/1900 | Rankert | F16L 21/08 285/337 |
| 658,863 | A | * | 10/1900 | Pfeffer | F16L 21/08 285/337 |
| 2,353,572 | A | * | 7/1944 | Kuster | F16L 23/08 114/22 |
| 3,333,872 | A | * | 8/1967 | Crawford, Sr. | F16L 21/08 285/374 |
| 3,415,547 | A | * | 12/1968 | Yano | F16L 55/178 285/337 |
| 4,940,259 | A | * | 7/1990 | Williams | F16L 23/024 285/3 |
| 8,732,916 | B2 | * | 5/2014 | Simons | B64G 1/641 24/268 |
| 2006/0170214 | A1 | * | 8/2006 | Valente | F16L 23/036 285/412 |

* cited by examiner

*Primary Examiner* — Aaron M Dunwoody
(74) *Attorney, Agent, or Firm* — Buchanan Ingersoll & Rooney PC

(57) ABSTRACT

A clamping structure configured to be secured about at least two pipes to securely hold the pipes adjacent each other during a pipeline assembly operation is disclosed. The device can be further used to adjust the relative positions of the two pipes and maintain the relative positions while the pipes are caused to be permanently affixed to each other. Some embodiments can include a clamping structure with a plurality of hingedly engaged clamp members and at least one spatial adjustment mechanism extending therefrom, the configurations of which may provide weld-access points that are conducive to the pipeline assembly operation.

20 Claims, 8 Drawing Sheets

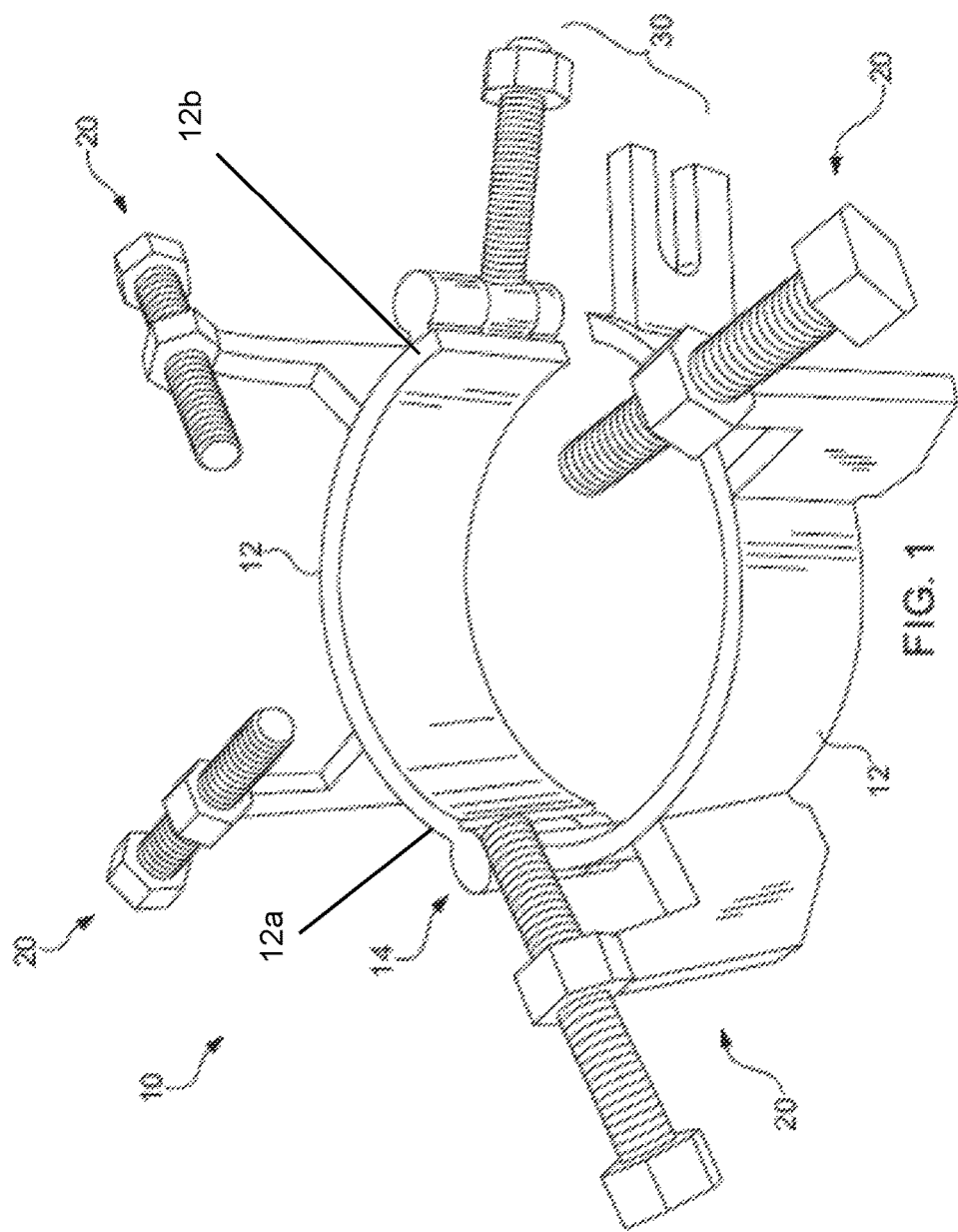

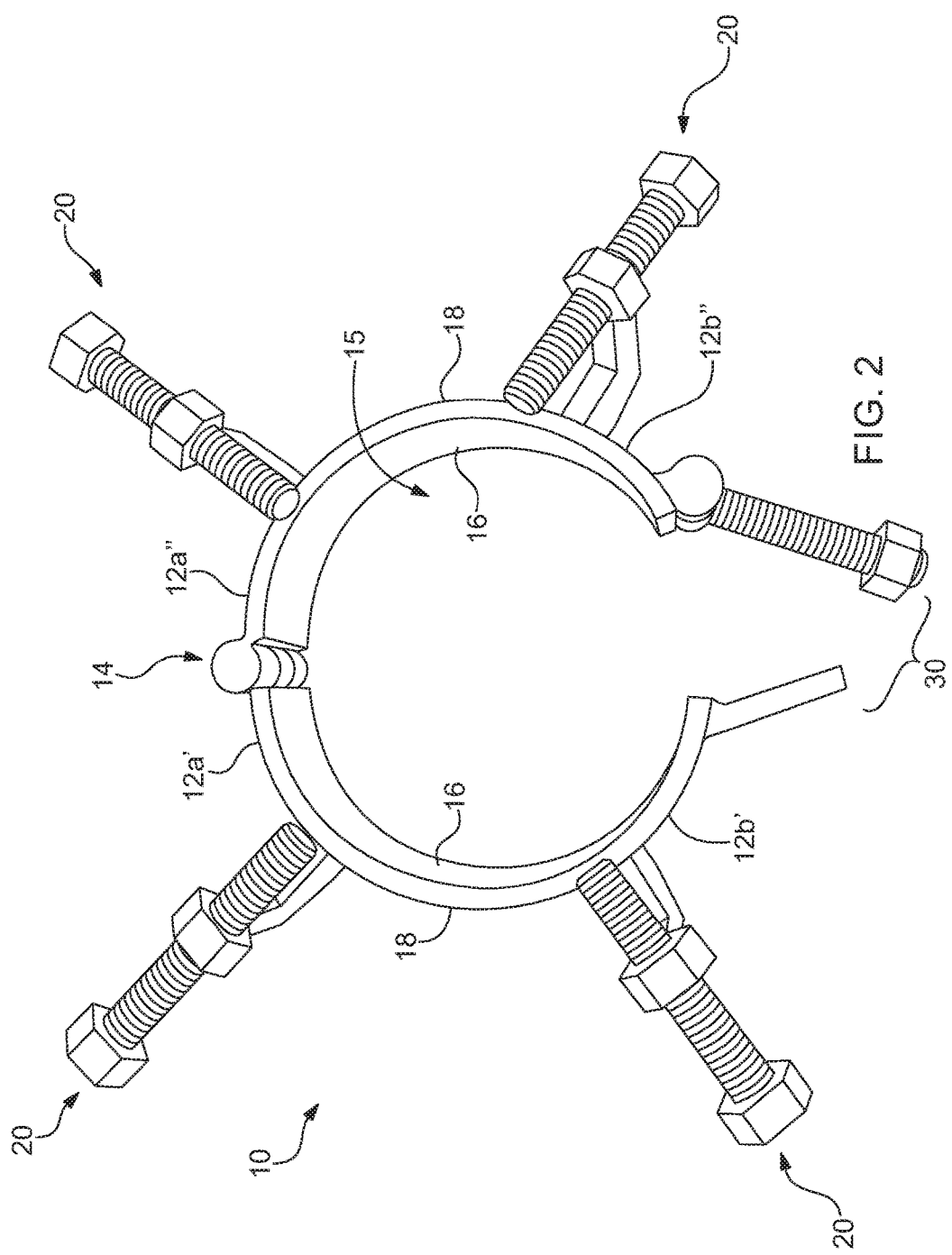

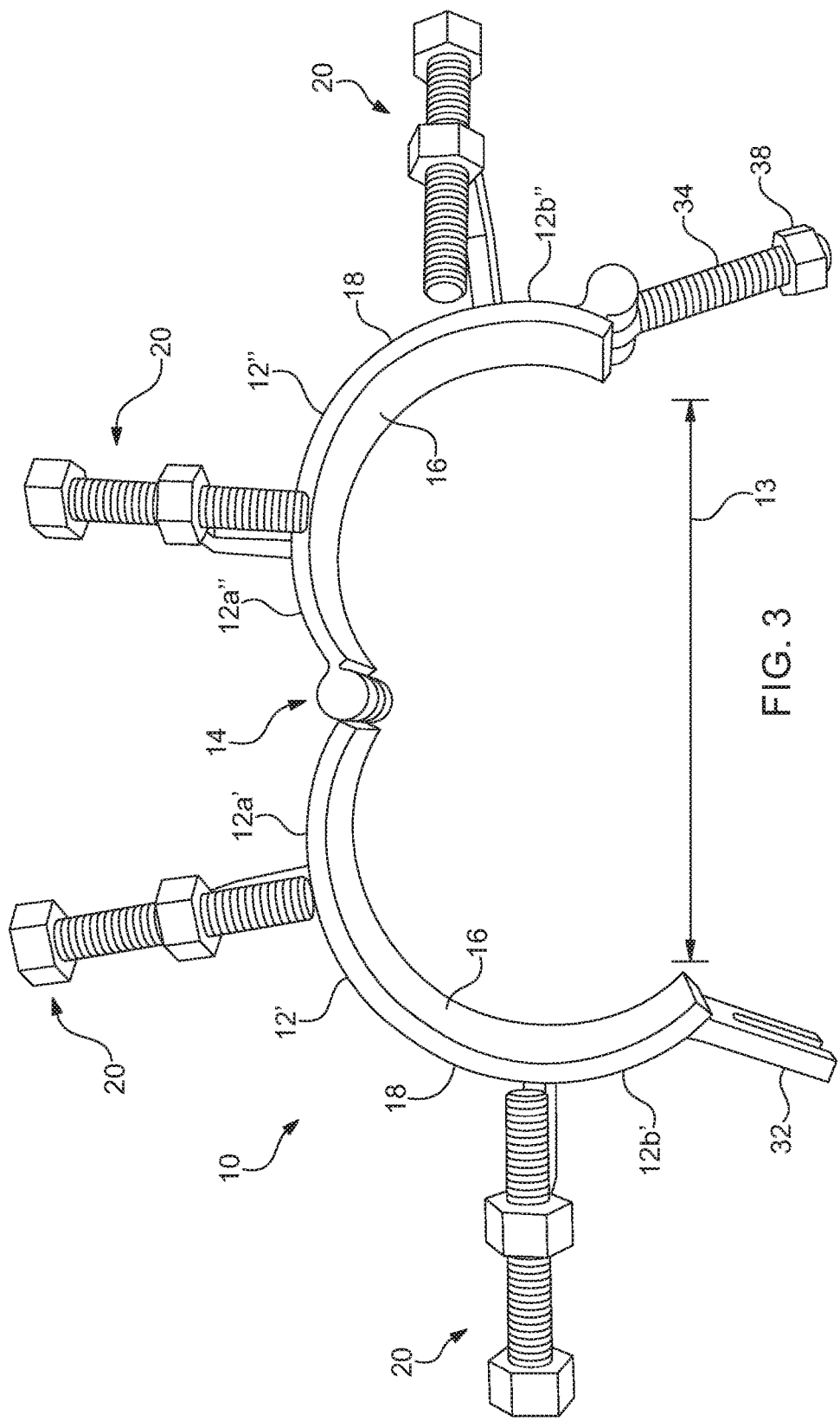

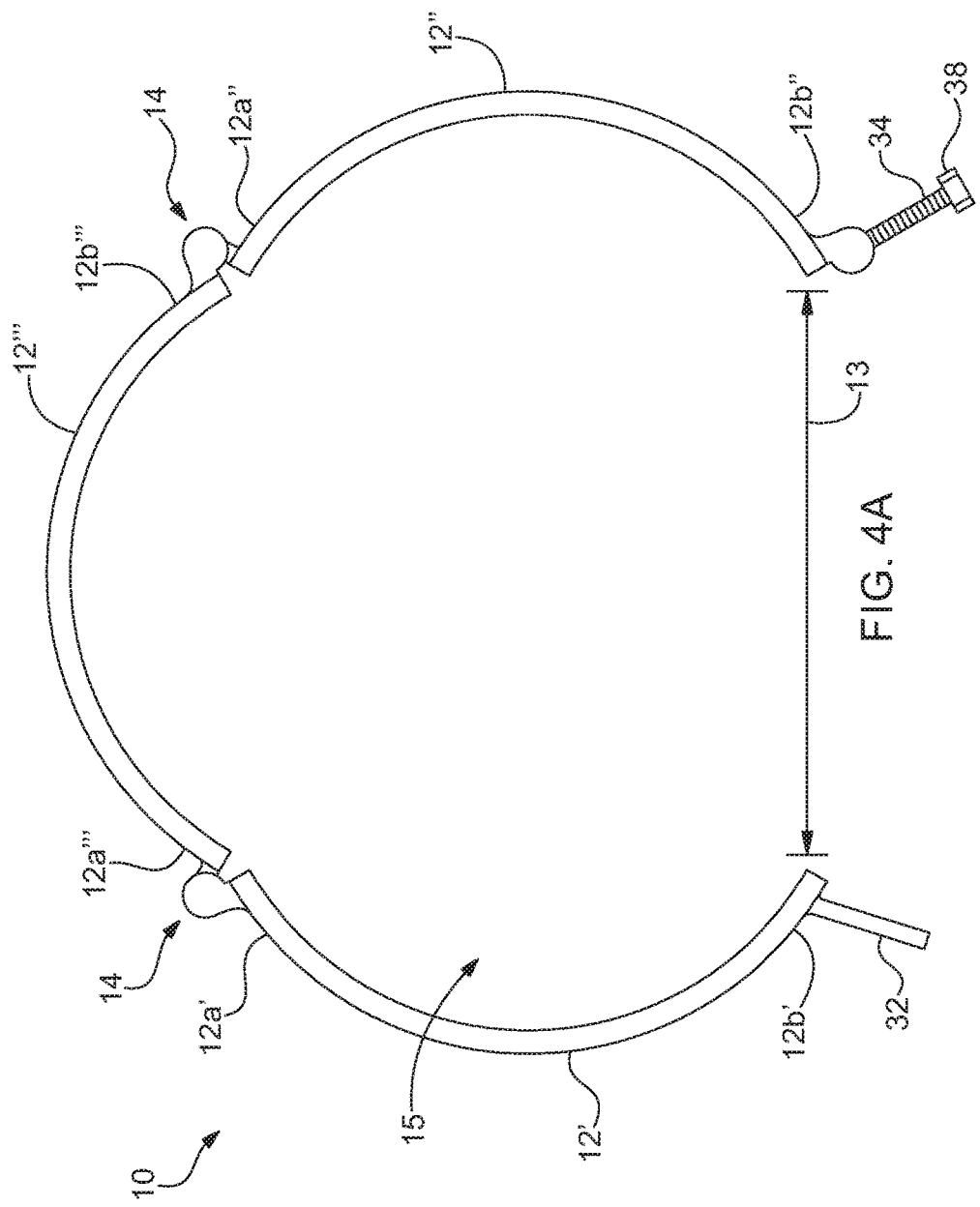

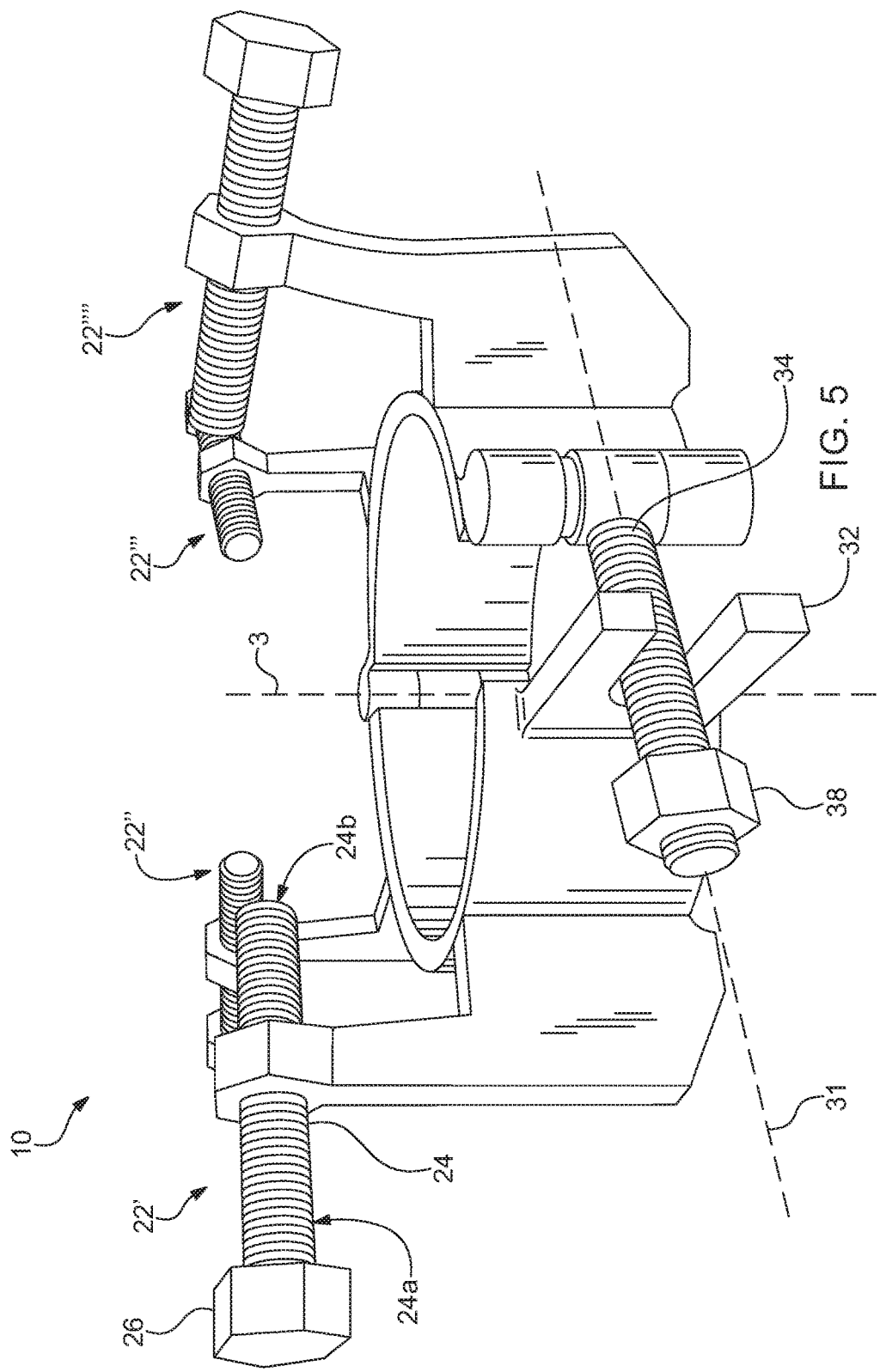

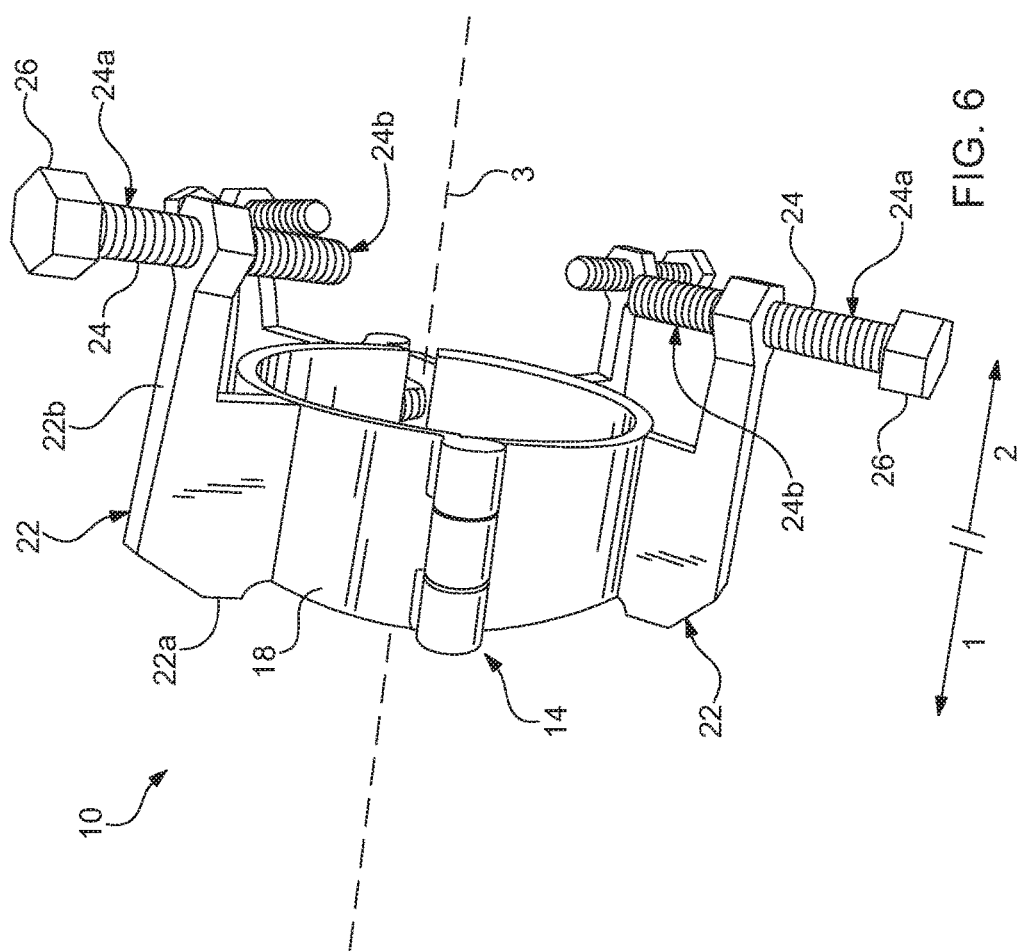

MULTI-USE PIPE CLAMP

FIELD OF THE INVENTION

The present invention relates to a clamping device to be secured about at least two objects to hold the objects adjacent each other, and in particular a clamping device that can be used to secure and align two pipes of a pipeline during assembly of the pipeline.

BACKGROUND OF THE INVENTION

During operations that include pipelines, the assembly and maintenance of the pipeline is required. Typically, a pipeline is constructed by the piecing of pipe sections together to generate an array of a plurality of pipe sections. Assembling the pipeline is generally done by welding, or otherwise affixing, two end-portions of adjacent pipe sections together. This can include welding the pipe sections at a butt joint. Proper alignment of the pipe sections can not only be a desired result of the assembly, but it may be important for the proper operation of the pipeline and safety of workers within the area of operation of the pipeline. Holding the pipe sections together and aligning them is typically done through the use of a clamping mechanism generally referred to as a Dearman clamp.

Existing devices and methods for holding two pipe sections adjacent each other and aligning the two pipe sections together consist of complex and even dangerous clamping mechanisms and clamping techniques. Some existing clamps include chains that ratchet the clamp in a circumferentially inward manner to draw the clamp into the pipe sections. Other clamps include complex arrays of tensioners, adjustment mechanisms, and/or guide rods. Not only are these complex, but they are also cumbersome and unwieldy. Operations that requiring piping are often in compromising areas of operation that are inherently dangerous. Thus, the more simplistic and more controllable the device is in such situations the better it may be for safety. Existing devices also have many components that are either prone to being lost or broken. Conditions in areas of operations surrounding pipelines can be harsh, not only on the workers but also on the equipment, and thus obviating use of easily lost or broken parts may be desired. Existing devices further fail to provide adequate workspace for a user. For example, after the clamp is secured to the pipe sections, a user typically engages in welding operations to permanently secure the two pipe sections together before removing the clamp. Yet, existing clamps tend to include structures and other mechanisms that transverse the abutment of the two pipe section and obstruct the view of, if not impede access to, the abutment for proper welding.

The present invention is directed toward overcoming one or more of the above-identified problems.

SUMMARY OF THE INVENTION

The device can include a clamping structure configured to be secured about at least two objects to hold the objects adjacent each other. The device can be further used to adjust the relative positions of the objects and maintain the relative positions while the objects are caused to be permanently affixed to each other. The objects can be sections of pipe; however, the device can be used in any situation where it is desired for any object (e.g., I-beams, billets, crank shafts, etc.) to be held adjacent to another object other during some stage of assembly comprising the objects. It is noted that a pipe section can be an elongated straight pipe section, angled pipe section, an elbow pipe section, an end-cap of a pipe section, etc. Compared to existing clamping devices, the inventive device may be stronger and more versatile. The simplicity of the inventive device can also make it much more user-friendly to accomplish the same job as other tools.

While these potential advantages are made possible by technical solutions offered herein, they are not required to be achieved. The presently disclosed device can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following Figures, in which:

FIG. 1 is a perspective view of an exemplary embodiment of the device.

FIG. 2 is a front view of the device of FIG. 1, showing it in a closed position.

FIG. 3 is a front view of the device of FIG. 1, showing it in an open position.

FIGS. 4A-4B show an alternative embodiment of the device, showing three clamp members hingedly connected together, and the three clamp members in juxtaposition, respectively.

FIG. 5 is a side view of the device of FIG. 1.

FIG. 6 is another side view of the device of FIG. 1.

DETAILED DESCRIPTION OF THE INVENTION

Figure 4B:
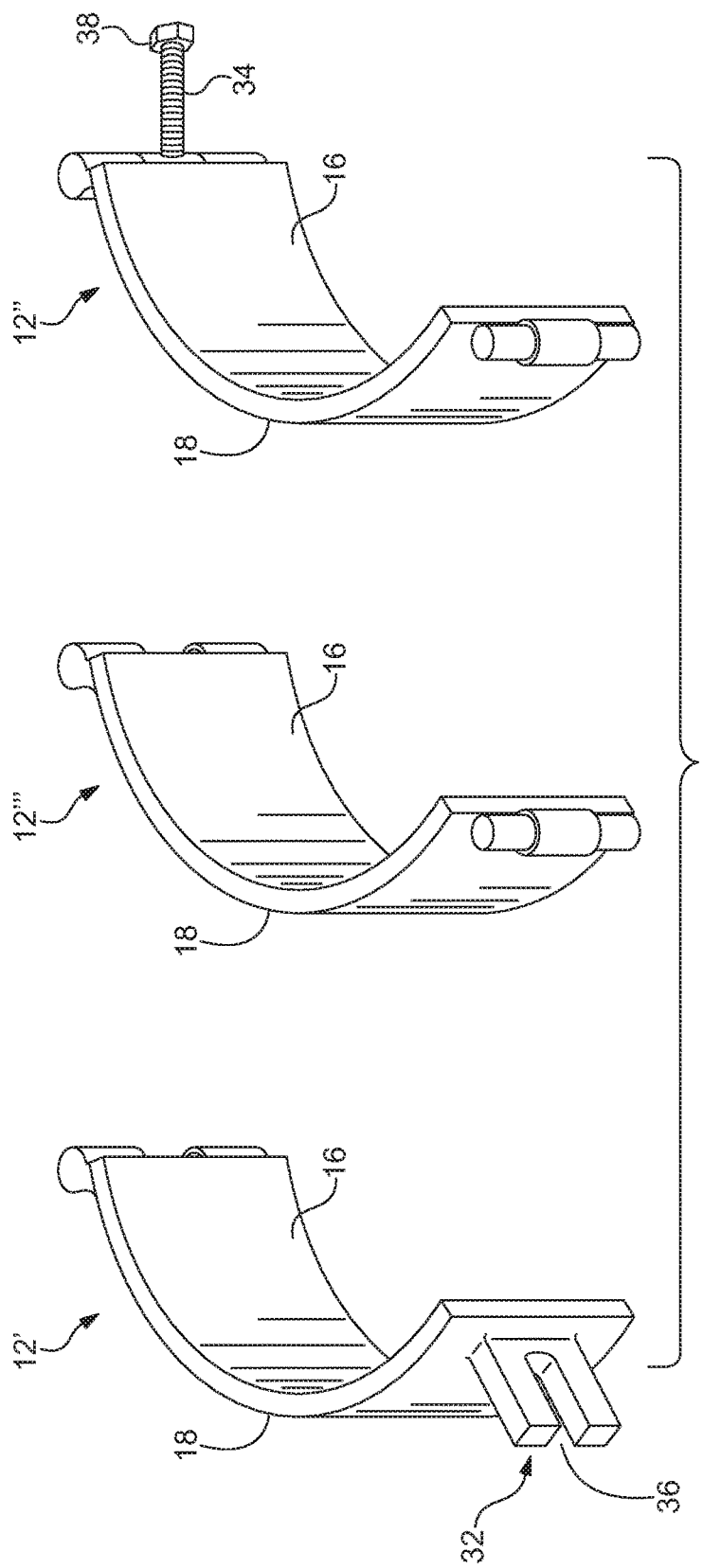

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Referring to FIGS. 1-3, the clamping structure 10 may be constructed as a plurality of hingedly engaged clamp members 12 with at least one spatial adjustment mechanism 20 extending therefrom, the configurations of which may provide weld-access points 11 (see FIG. 7) that are conducive to the pipeline assembly operation. Any component of the clamping structure 10 can be fabricated from a tough, durable, rigid material. This may include metal, metal alloy, polyurethane, plastic, ceramic, composite material, and/or any combination thereof. Any component can be fabricated from a material that is the same as or different from a material used to fabricate another component of the clamping structure 10. In some embodiments, the clamping structure 10 can provide a nearly 360°-degree weld-access point 11 about a circumference of the pipeline where the two pipe sections meet. The clamping structure 10 can be structured as a relatively light-weight device with minimal moving parts and little to no assembly required. Although the device it relatively light-weight, each component part of the device can be made as a heavy-duty, durable part so as to ensure against damage. The manner in which the device is operated can make the device more versatile, allowing for use with various objects and various sized objects. The specific configuration of the device can lend itself to be light-weight, durable, safe, versatile, and/or easily usable.

The clamping structure 10 can include a plurality of clamp members 12. Any two clamp members 12 can be fixedly attached to each other or hingedly engaged 14 to each other. The hinged engagement 14 can be a barrel-type hinge, but other hinging engagements can be used. This may include, but is not limited to, ball-and-socket joint, swivel joint, etc. Any one of the clamp members 12 can be structured as an elongated member having a first end 12a and a second end 12b. Any clamp member 12 can be a first gate clamp member 12' and/or a second gate clamp member 12".

For example, the clamping structure 10 can include a first gate clamp member 12' and a second gate clamp member 12". The clamping structure 10 can further include a first gate clamp member 12' hinged engaged to a second gate clamp member 12" via the hinged engagement 14. The first gate clamp member 12' can include a hinged end as its first end 12a' and a mouth end as its second end 12b'. The second gate clamp member 12" can include a hinged end as its first end 12a" and a mouth end as its second end 12b". The hinged ends 12a', 12a" of the first and second gate clamp members 12', 12" can be attached via the hinged engagement 14. The mouth ends 12b', 12b" of the first and second gate clamp members 12', 12" can be structure to move toward and away from each other when the first gate clamp member 12' is rotated about the hinged engagement 14 relative to the second gate clamp member 12". The clamping structure 10 can form a closed position when the mouth end 12b' of the first gate clamp member 12' abuts, or is at least adjacent, the mouth end 12b" of the second gate clamp member 12" (see FIG. 2). The clamping structure 10 can form an open position when the mouth end 12b' of the first gate clamp member 12' is moved away from the mouth end 12b" of the second gate clamp member 12' so as to facilitate insertion of an object within an opening 13 defined by a volume of space between the first gate clamp mouth end 12b' and the second gate clamp mouth end 12b" (see FIG. 3).

Referring to FIGS. 4A-4B, some embodiments can include at least one intermediary clamp member 12''' positioned between the first gate clamp member 12' and the second gate clamp member 12". For example, the clamping structure 10 can include an intermediary clamp member 12''' having a first end 12a''' and a second end 12b'''. The first end 12a''' of the intermediary clamp member 12''' can be attached to the first end 12a' of the first gate clamp member 12', and the second end 12b''' of the intermediary clamp member 12''' can be attached to the first end 12a" of the second gate clamp member 12". Any one of the attachments between the intermediary clamp member 12''' and the first and second gate clamp members 12', 12" can be fixed or hinged. It is contemplated for at least one of the attachments between the intermediary clamp member 12''' and the first and second gate clamp members 12', 12" to be hinged 14 to facilitate transitioning the clamping structure 10 to and from the open and closed positions.

Further embodiments can include a plurality of intermediary clamp members 12''' that can be fixedly or hingedly attached to each other, where at least one intermediary clamp member 12''' is attached to the first end 12a' of the first gate clamp member 12', and at least one other intermediary clamp member 12'''' is attached to the first end 12a" of the second gate clamp member 12". For example, the first end 12a''' of the first intermediary clamp member 12''' can be attached to the first end 12a' of the first gate clamp member 12', the second end 12b' of the first intermediary clamp member 12''' can be attached to a first end 12a''' of a second intermediary clamp member 12'''', and the second end 12b''' of the second intermediary clamp member 12''' can be attached to the first end 12a" of the second gate clamp member 12". Any one of the attachments between the intermediary clamp members 12''' and the first and second gate clamps 12', 12" can be fixed or hinged. The clamping structure 12 can further include additional intermediary clamp members 12'''.

It is contemplated for the clamping structure 12 to be transitioned to the open position by moving the first gate clamp member 12' relative to the second gate clamp member 12" to as to generate the opening 13 and/or widen the opening 13 so as to allow for ingress/egress of the pipe section(s) through the opening 13 and into a gap 15. The gap 15 can be defined by a volume of space between inner surfaces 16 of the clamp members 12. The clamping structure 10 can then be transitioned to the closed position to cause at least a portion of the inner surfaces 16 to make contact with the pipe section(s).

Any clamp member 10 can exhibit a particular shape. It is contemplated that when the clamping structure 10 is caused to secure about the pipe section(s), the overall shape of the clamping structure 10 conforms to a cross-sectional shape of the pipe section(s), at least near distal ends of the pipe section(s) that are to be abutted against each other. For example, a pipe section can exhibit a circular cross-section such that its outer surface is circular. Thus, each clamp member's inner surface 16 can be arcuate so that when the clamping structure 10 is caused to secure about the pipe section(s), the resultant shape of the plurality of clamp members 12 is circular. In other embodiments, the clamp members' inner surfaces 12 can be angled to conform to a square-shaped object, hexagonal-shaped object, etc. In other embodiments, the clamp members' inner surfaces 16 can be curved, curvelinear, serrated, etc. Further, any one clamp member 12 can be of a same shape or a different shape as that of another clamp member 10. Moreover, any clamp members' inner surface 16 can be the same shape or a different shape as its outer surface 18. The outer surface 18 can be the surface that faces outward from the pipe section(s) and does not make contact with the pipe section(s) when the device is caused to be secured about the pipe section(s). While the inner surfaces 16 of each clamp member 12 may be configured to conform to cross-sectional portions of the pipe section(s), the outer surfaces 18 of each clamp member may be configured for a different purpose. For example, the outer surfaces 18 may be angled to generate any overall hexagonal shape to the outer surface 18 of the clamping structure 10 so as to facilitate better gripping and handling.

The rotation of at least one clamp member 12 relative to another clamp member 12 (e.g., rotation of the first clamp gate member 12' relative to the second gate clamp member 12") can not only widen or narrow the opening 13 but can also widen or narrow the gap 15. Thus, selectively varying the opening 13 and/or the gap 15 can add to the versatility of the device. Pipes can have varying sizes and shapes, and thus it may be beneficial to have a device that can accommodate the varying sizes and shapes of the pipes. Further, while the inner surfaces 16 of each clamp member 12 may be configured to conform to cross-sectional portions of the pipe section(s), it may not be necessary for them to conform exactly thereto, or conform thereto to a substantial extent. This is because clamping structure 10 can be transitioned to the closed position to cause at least a portion of the inner surfaces 16 to make contact with the pipe section(s), regardless of the inner surfaces 16 of the clamping structure 10 conforming to the cross-sectional shape of the pipe section(s).

In some embodiments, the clamping structure 10 can include a locking mechanism 30. The locking mechanism 30 can be disposed on at least one of the first gate clamp member mouth end 12b' and the second gate clamp member mouth end 12b". The locking mechanism 30 can arrest movement of the first gate clamp member 12' relative to the second gate clamp member 12". In some embodiments, the locking mechanism 30 can arrest movement of the first gate first gate clamp member 12' relative to the second gate clamp member 12" to cause the device to be secured about a pipe section. In at least one embodiment, the locking mechanism 30 can include a latch 32 disposed on the mouth end 12b' of the first gate clamp member 12' and a bolt 34 disposed on the mouth end 12b" of the second gate clamp member 12", where the bolt 34 can engage the latch 32. However, other locking mechanisms 30 can be used.

Referring to FIGS. 5-6, as a non-limiting example, the latch 32 can include a slotted plate extending from a distal end of the first gate clamp member mouth end 12b'. The bolt 34 can be hingedly attached to a distal end of the second gate clamp member mouth end 12b". As the mouth ends 12b', 12b" of the first gate clamp member 12' and the second gate clamp member 12' are caused to move towards each other so that the bolt 34 is in proximity of the latch 32, the bolt 34 can be rotated to be slidably received by the slot 36 of the plate. When the bolt 34 is rotated to be received by the slot 36 the clamping structure 10 can be in a locked state, and when the bolt 34 is rotated out from the slot 36 the clamping structure 10 can be in an unlocked state. The bolt 34 can further include a head 38 that is wider than the slot 36 so that when the bolt 34 is received in the slot 36, the plate abuts against the head 38 if the clamping structure 10 is caused to transition towards a further open position after being in the closed position, thereby keeping the device locked in the closed position. The bolt 34 can be threaded and the head 38 can be a threaded nut so that the head 38 can be advanced in a longitudinal direction 31 of the bolt 34. This can further facilitate tightening and/or loosening the clamping structure 10 around the pipe. For example, when the clamping structure 10 is in the locked state, the head 38 can be advanced in the longitudinal direction 31 towards the mouth end 12b" of the second clamp member 12" and can cause the first gate clamp member 12' to move more towards the second gate clamp member 12" so that each clamp member 12 advances circumferentially inward to reduce the gap 15. Reducing the gap 15 can cause at least a portion of the inner surface 16 of the clamping structure 10 to be pressed against at least a portion of an outer surface of the pipe section(s) that is within the gap 15.

The clamping structure 10 can further include at least one spatial adjustment mechanism 20. The spatial adjustment mechanism 20 can be used to adjust relative positions between two pipe sections. This may include aligning the two sections of pipe. Aligning can include securing a first pipe section in a position relative to a position of a second pipe section, which may include: 1) causing the first pipe section to abut the second pipe section; 2) causing a distal end of the first pipe section to abut a distal end of the second pipe section; 3) causing the first pipe section to lie adjacent but not abut the second pipe section; 4) causing a distal end of the first pipe section to lie adjacent to but not abut a distal end of the second pipe section; 5) causing the first pipe section to extend coaxially with, or at an angle relative to, the second pipe section; and/or, 6) causing a beveled or mitered section of the first pipe section to match with, or be flush with, a beveled or mitered section of the second pipe section.

In one embodiment, the spatial adjustment mechanism 20 can include at least one frame 22, each frame 22 including a spindle 24 and a knob 26. The frame 22 can extend from an outer surface 18 of any one of the clamp members 12. The frame 22 can be an angled structure including an extender portion 22a extending from the outer surface 18 of the clamp member 12 and a spindle support portion 22b extending from the extender portion 22a. In some embodiments, the extender portion 22a extends at an angle (e.g., 90°-degree angle) from the outer surface 18 of the clamp member 12 and the spindle support portion 22b extends at an angle (e.g., 90°-degree angle) from the extender portion 22a. While the angles are shown to be 90° degrees, other angles can be used.

It is contemplated for each spindle support portion 22b of each frame 22 to extend from the extender portion 22a so that the spindle support portion 22b extends towards the rear 2 of the device; however, any one frame can be structured so that the spindle support portion 22b extends to the front 1, or any other direction, of the device. It should be noted that the front 1 and rear 2 of the device are arbitrarily chosen for ease of illustration purposes only. The spindle support portion 22b can include a threadingly engagement with a spindle 24 so as to enable transverse motion of the spindle 24 through the spindle support portion 22b. For example, the spindle 24 can be rotated so as to cause the spindle 24 to move radially inward toward, and radially outward from, a central axis 3 of the gap 15 of the device. Any one spindle 24 can include a first distal end 24a and a second distal end 24b. The first distal end 24a can include a knob 26 to facilitate grasping and manipulation (e.g., rotation via the threading engagement) of the spindle 24. For example, a user can grasp the knob 26 and rotate the spindle 24 to cause the second distal end 24b to make contact with a pipe section and cause the pipe section to move in a direction that is the same direction the spindle 24 is being advanced. A user can grasp the knob 26 and rotate the spindle 224 to cause the second distal end 24b to move away from a pipe section and allow the pipe section to move in a direction that is the same direction the spindle 24 is being withdrawn.

In some embodiments, the spatial adjustment mechanism 20 can include a plurality of frames 22. The plurality of frames 22 can extend from a surface of the clamping structure 10 so that each frame 22 is equidistant from each other frame 22. For example, the device can include a spatial adjustment mechanism 20 having four frames 22 (e.g., a first frame 22', a second frame 22", a third frame 22"', and a fourth frame 22"") disposed on an outer surface 18 of the clamping structure 10, each frame 22 being equidistant from another frame 22. More or less frames 22 can be used. The more frames 22 that are used can provide for a more precise adjustment of the relative positions of the pipe sections. For example, a spatial adjustment mechanism 20 with twelve frames 22 can provide for twelve vectors by which the pipe sections can be spatially adjusted. In further embodiments, a distance between any two frames 22 may not be the same as a distance between any other two frames 22. This may be done to facilitate more precise adjustment at one portion or sectant as compared to another portion or sectant. Any of the spindles 24 of the plurality of frames 22 can be operated in unison or independently of each other.

Figure 7:
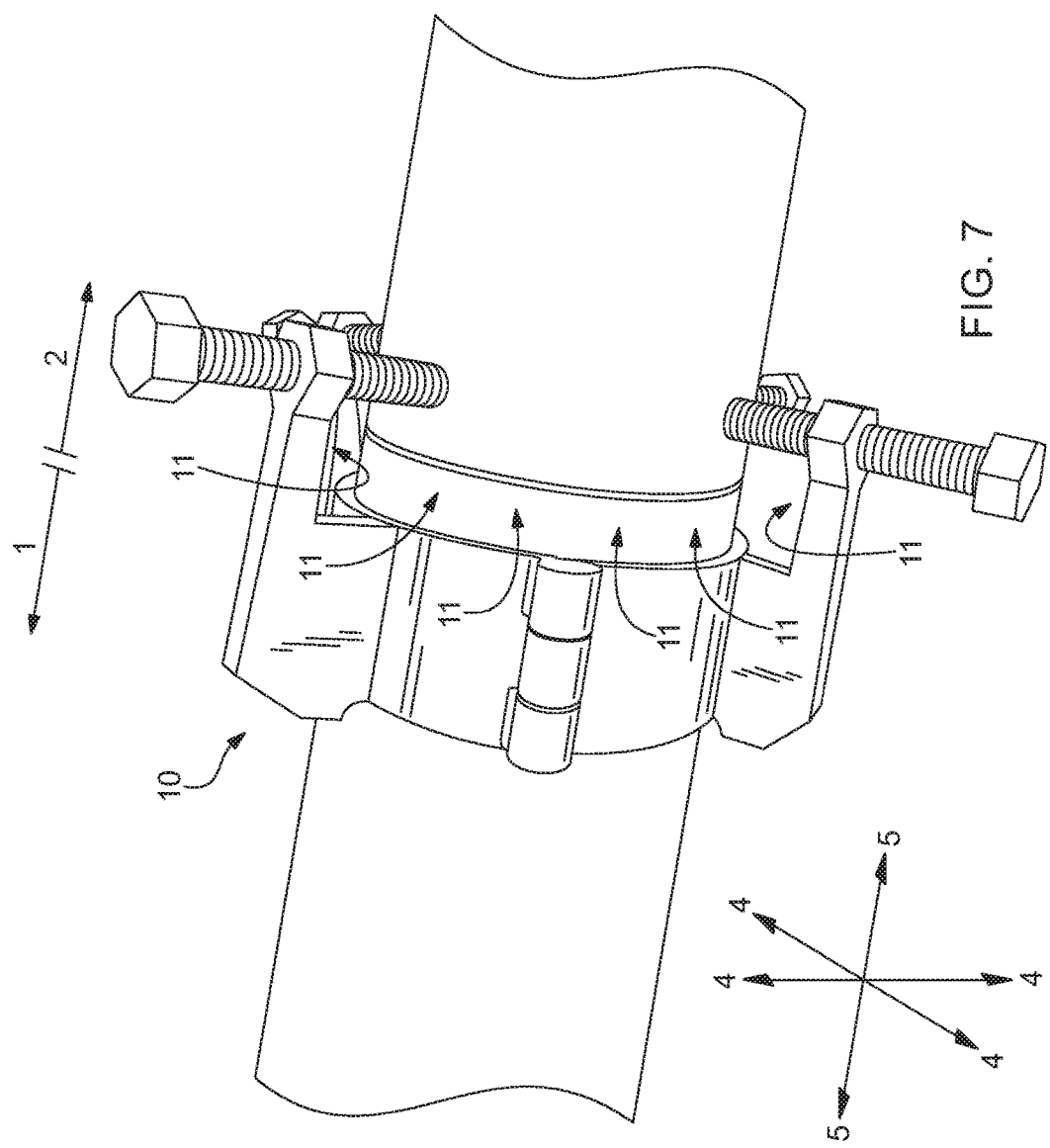
FIG. 7 is shows the device being used to secure two sections of pipe in relative positions next to each other.

Referring to FIG. 7, in some embodiments, the spatial adjustment mechanism 20 can serve as both a clamp means and an adjustment means. For example, the device can be used to secure the clamping structure 10 about a first section of pipe by transitioning the clamping structure 10 to the open position and inserting the first section of pipe through the opening 13 and into the gap 15. The clamping structure 10 can then be transitioned towards the closed position, securing the first section of pipe within the gap. The clamping structure 10 can then be locked via the locking mechanism 30. The locking mechanism 30 can be further used to transition the clamping structure 10 to a further closed position, thereby securely fastening the device to the first section of pipe. A second section of pipe can be placed adjacent to the first section of pipe and secured in position via the spindles 24 being advanced in the radial inward direction to cause the second ends 24b of each spindle 22 to make contact with and be pressed against at least a portion of an outer surface of the second section of pipe. This can cause the first section of pipe to be fixed relative to the second section of pipe. The spindles 24 can be caused to advance further to securely fasten the device to the second section of pipe. This can cause the first section of pipe to be securely positioned relative to the second section of pipe. The spatial adjustment mechanism 20 can then be used to adjust relative positions between the first section of pipe and the second section of pipe, which may include aligning the two sections of pipe.

For example, any one of the spindles 24 can be advanced in the radially inward direction or withdrawn in the radially outward direction to cause or allow the second section of pipe to move relative to the first section of pipe. This movement can be in a lateral direction 4 caused by the advancement of any one spindle 24. As a non-limiting example, the spatial adjustment mechanism 20 can include a first frame 22' positioned at 12 o'clock, a second frame 22" positioned at 3 o'clock, a third frame 22'" positioned at 6 o'clock, and a fourth frame 22"" positioned at 9 o'clock. The spindle 24 of the first frame 22' can be withdrawn in the radially outward direction (allowing the second pipe section to move in the 12 o'clock direction) while the spindle 24 of the third frame 22'" is advanced in the radially inward direction (causing the second pipe section to move in the 12 o'clock direction).

In addition, any number of spindles 24 can be withdrawn in the radially outward direction to allow the second section of pipe to be moved longitudinally 5 relative to the first section of pipe. For example, withdrawing at least one spindle 24 can be done to give some play to the second section of pipe to allow it to be moved longitudinally 5 relative to the first section of pipe but to still hold the second section of pipe in a relatively fixed position to the first section of pipe. Alternatively, or in addition, the clamp members 12 of the clamping structure 10 can be loosened via the locking mechanism 30 to allow the first second of pipe to be moved longitudinally 5 relative to the second section of pipe. Again, loosening the locking mechanism 30 can be done to give some play to the first section of pipe to be moved longitudinally 5 relative to the second section of pipe but to still hold the first section of pipe in a relatively fixed position to the second section of pipe. Thus, the locking mechanism 30 and/or the spatial adjustment mechanism 20 can be loosened and/or tightened incrementally so as to enable controlled adjustment of the relative positions of the first and second sections of pipe while still safely securing the two pipe sections together.

As noted above, any of the extender portions 22a and/or the spindle support portions 22b can extend at angles different from 90° degrees. This may be done to allow the spindle 24 to be advanced and/or withdrawn in directions that are not perpendicular to the central axis 3 of the gap 15 of the device. A portion of the second section of pipe may be beveled, chamfered, or otherwise angled, and thus a more secure affixment may be achieved when the spindle 24 is advanced upon the second section of pipe in a direction that is perpendicular to the outer surface of the second section of pipe. In at least one embodiment, the spindle support section 22b can be rotatingly attached to the extender portion 22a (e.g., via ratcheting mechanism) to allow for a relative angle adjustment between the extender portion 22a and the spindle support portion 22b.

In some embodiments, at least one spindle 24 and/or frame 22 can include a dial or other indicator to indicate the amount the second distal end 24b of the spindle 24 is advanced toward the central axis 3 of the gap 15.

In some embodiments, electro-mechanical actuators (not shown) can be used to control any of the spindles 24 and/or locking mechanism 30. For example, an electro-mechanical actuator comprising an electric motor in connection with a worm-gear can be used to cause any of the head 38 of the locking mechanism 30 and/or the spindles 24 of the frames 22 to be advanced and/or withdrawn in a desired direction.

The specific configuration of the device with the spatial adjustment mechanism 20 extending from the clamping structure 10, where the adjustment mechanism 20 comprises at least one frame 22 as described herein, can generate at least one weld-access point 11. The weld-access point 11 can be located in a salutary position so as to grant easy and maximum access to the abutment of the two pipe sections. For example, as the device secures the first section of pipe within the clamping structure 10 and the second section of pipe within the spatial adjustment mechanism 20, the alignment (which may include the abutment) of the two pipe sections can be within an exposed area of the device that lies between the clamping structure 10 and the spatial adjustment mechanism 20. This exposed area can be the weld-access point 11. With the spatial adjustment mechanism 20 being configured as the plurality of frames 22 extending from the outer surface 18 of the clamping structure 12, the weld-access point 11 can be maximized. The ability to have the alignment of the two sections of pipe within the weld-access point 11 and the ability to maximize the weld-access point 11 can provide for an area of operation for a welder that is very conductive to the pipe assembly operation.

In an exemplary embodiment, the device can include a clamping structure 10 configured to secure about at least a portion of a first pipe section. The device can further include a spatial adjustment mechanism 20 disposed on a portion of the clamping structure 10 and configured to secure about at least a portion of a second pipe section. The clamping structure 10 can be structured to hold the first pipe section in a fixed position relative to the second pipe section. The spatial adjustment mechanism 20 can be structured to hold the second pipe section in a fixed position relative to the first pipe section and to cause alignment of the first pipe section with the second pipe section. At least one weld-access point 11 can be positioned between the spatial adjustment mechanism 20 and the clamping structure 10. A locking mechanism 30 configured to cause the clamping structure 10 to secure about the first pipe section can be included. In some embodiments, the alignment of the first pipe section with the second pipe section can include at least one of: 1) causing the first pipe section to abut the second pipe section; 2) causing a distal end of the first pipe section to abut a distal end of the second pipe section; 3) causing the first pipe section to lie adjacent but not abut the second pipe section; 4) causing the distal end of the first pipe section to lie adjacent but not abut the distal end of the second pipe section; 5) causing the first pipe section to extend coaxially with, or at an angle relative to, the second pipe section; and, 6) causing a beveled or mitered section of the first pipe section to match with, or be flush with, a beveled or mitered section of the second pipe section. In some embodiments, adjustment of the locking mechanism 30 may facilitate movement of the first pipe section longitudinally 5 and/or laterally 4. In some embodiments, adjustment of the spatial adjustment mechanism 20 can facilitate movement of the second pipe section longitudinally 5 and/or laterally 4. In some embodiments, the clamping structure 10 can be transitionable to an open position to facilitate insertion of at least a portion of the first pipe section through an opening 13 in the clamping structure 10. In some embodiments, the clamping structure 10 can be transitionable to a closed position to cause at least a portion of an inner surface 16 of the clamping structure 10 to make contact with the first pipe section. In some embodiments, an inner surface 16 of the clamping structure 10 can be made to conform to an outer shape of the first pipe section. In some embodiments, the at least one weld-access point 11 further comprises exposed areas of the first pipe section and the second pipe section that provides approximately 360°-degree access to an interface between the first pipe section and the second pipe section. In some embodiments, the spatial adjustment mechanism 20 can extend from an outer surface 18 of the clamping structure 20.

In another exemplary embodiment, the device can include a clamping structure 10 comprising a plurality of clamp members 12, each clamping member 12 having an inner surface 16 and an outer surface 18, wherein at least one clamp member 12 is hingedly engaged 14 with another clamp member 12, wherein at least a portion of the inner surface 16 of at least one clamp member 12 is structured to rest against an outer surface of a first pipe section to secure at least a portion of the first pipe section within the clamping structure 12. The device can further include a spatial adjustment mechanism 20 disposed on a portion of the clamping structure 10 and configured to secure at least a portion of a second pipe section within the spatial adjustment mechanism 20. The clamping device may be further structured to hold the first pipe section in a position relative to a position of the second pipe section. The clamping structure 10 can be transitionable to and from an open position and a closed position by rotation of at least one clamp member 12 relative to another clamp member 12 about the hinged engagement 14. Some embodiments include at least one weld-access point 11 positioned between the spatial adjustment mechanism 20 and the clamping structure 10. Some embodiments include a locking mechanism 30 configured to cause the clamping structure 10 to secure about the first pipe section. In some embodiments, the clamping structure 10 and the spatial adjustment mechanism 20 can be structured to hold the first pipe section in a fixed position relative to the second pipe section and to cause alignment of the first pipe section with the second pipe section. In some embodiments, the clamping structure 10 can align the first pipe section with the second pipe section by at least one of: 1) abutting the first pipe section with the second pipe section; 2) abutting a distal end of the first pipe section with a distal end of the second pipe section; 3) the first pipe section lying adjacent to but not abutting the second pipe section; 4) the distal end of the first pipe section lying adjacent to but not abutting the distal end of the second pipe section; 5) extending the first pipe section coaxially with, or at an angle relative to, the second pipe section; and, 6) a beveled or mitered section of the first pipe section matching with, or being flush with, a beveled or mitered section of the second pipe section. In some embodiments, at least one of the locking mechanism 30 and the spatial adjustment mechanism 20 can be structured to facilitate longitudinal 5 and/or lateral 4 displacement of the first pipe section relative to the second pipe section via adjustments to at least one of the locking mechanism 30 and the spatial adjustment mechanism 20. In some embodiments, transitioning the clamping mechanism 10 to the open position generates an opening 13 defined by a volume of space between distal ends of two clamp members 12. In some embodiments, the spatial adjustment mechanism can further include at least one frame 22 with an extender portion 22a extending from the outer surface 18 of at least one clamp member 12 and a spindle support portion 22b extending from the extender portion 22a. The spatial adjustment mechanism 20 can further include a spindle 24 within the spindle support portion 22b, the spindle 22 having a first end 24a and a second end 24b. The spindle 24 can be movable to cause the second end 24b of the spindle 24 to make contact with and be pressed against at least a portion of an outer surface of the second pipe section.

In another exemplary embodiment, the device can include a clamping structure 10 comprising a plurality of clamp members 12, each clamping member 13 having an inner surface 16 and an outer surface 18, wherein at least one clamp member 12 may be hingedly engaged 14 with another clamp member 14, wherein at least a portion of the inner surface 16 of at least one clamp member 12 can be structured to rest against an outer surface of a first pipe section to secure at least a portion of the first pipe section within the clamping structure 10. The device can further include a spatial adjustment mechanism 20 disposed on a portion of the clamping structure 10 and configured to secure at least a portion of a second pipe section within the spatial adjustment mechanism 20. The device can be structured to hold the first pipe section in a position relative to a position of the second pipe section. The plurality of clamping members 12 may comprises a first gate clamp member 12' having a mouth end 12b' and a hinged end 12a' and a second gate clamp member 12" having a mouth end 12b" and a hinged end 12a", the hinged end 12a' of the first gate clamp member 12 being hingedly engaged 14 with the hinged end 12a" of the second gate clamp member 12". The clamping structure 12 can be transitionable to an open position by rotating the first gate clamp member mouth end 12b' away from the second clamp member mouth end 12b", and the clamping structure can be transitionable to a closed position by rotating the first gate clamp member mouth end 12b' toward the second clamp member mouth end 12b". In an open position, an opening 13 may be formed defined by a volume of space between the first gate clamp mouth end 12b' and the second gate clamp mouth end 12b". Some embodiments include at least one weld-access point 11 positioned between the spatial adjustment mechanism 20 and the clamping structure 10. In some embodiments, the spatial adjustment mechanism can further include at least one frame 22 with an extender portion 22a extending from the outer surface 18 of at least one clamp member 12 and a spindle support portion 22b extending from the extender portion 22a. The spatial adjustment mechanism 20 can further include a spindle 24 within the spindle support portion 22b, the spindle 24 having a first end 24a and a second end 24b. The spindle 24 can be movable to cause the second end 24b of the spindle 24 to make contact with and be pressed against at least a portion of an outer surface of the second pipe section.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

I claim:

1. A clamping device, comprising:
    a clamping structure comprising a plurality of clamp members, each clamp member having a first end and a second end, the first end of each clamp member being connected to another clamp member via a hinged engagement, each clamp member comprising an inner surface and an outer surface, wherein a volume of space between the inner surface of each clamp member defines a gap having a central axis, the central axis running parallel with an axis of rotation for each hinged engagement;
    wherein the plurality of clamp members comprises:
        a first gate clamp member, the second end of the first gate clamp member forming a first gate clamp member mouth end;
        a second gate clamp member, the second end of the second gate clamp member forming a second gate clamp member mouth end;
        wherein the first gate clamp member mouth end is capable of movement relative to the second gate clamp member mouth end as the first gate clamp member is rotated about its hinged engagement with another clamp member; and
        wherein the second gate clamp member mouth end is capable of movement relative to the first gate clamp member mouth end as the second gate clamp member is rotated about its hinged engagement with another clamp member;
    a locking mechanism disposed on at least one of the first gate clamp member mouth end and the second gate clamp member mouth end, the locking mechanism configured to selectively arrest movement of the first gate clamp member relative to the second gate clamp member; and
    a spatial adjustment mechanism, comprising:
        at least one frame extending from the outer surface of at least one clamp member;
        a spindle in mechanical engagement with the at least one frame, the mechanical engagement facilitating at least one of movement of the spindle radially inward towards the central axis of the gap and movement of the spindle radially outward from the central axis of the gap; and
        wherein an exposed area is formed between the clamping structure and the spatial adjustment mechanism, the exposed area forming a weld-access point.

2. The clamping device recited in claim 1, wherein the at least one frame comprises an extender portion extending from the outer surface of the at least one clamp member and a spindle support portion extending from the extender portion.

3. The clamping device recited in claim 2, wherein the extender portion extends at a 90-degree angle from the outer surface of the at least one clamp member and the spindle support portion extends at a 90-degree angle from the extender portion.

4. The clamping device recited in claim 1, wherein each clamp member has the at least one frame extending from its outer surface.

5. The clamping device recited in claim 4, wherein the mechanical engagement of each spindle is configured to facilitate movement of each spindle independently of each other spindle.

6. The clamping device recited in claim 4, wherein each frame is spaced equidistant from each other frame.

7. The clamping device recited in claim 1, wherein the locking mechanism comprises:
    a latch disposed on the first gate clamp member mouth end; and
    a bolt disposed on the second gate clamp member mouth end;
    wherein the bolt is configured to engage the latch.

8. The clamping device recited in claim 1, wherein each inner surface of each clamp member has an arcuate shape.

9. The clamping device recited in claim 1, wherein each hinged engagement is a barrel-type hinge.

10. A clamping device, comprising:
    a clamping structure comprising:
        a first clamp member having a first end, a second end, an inner surface, and an outer surface;
        a second clamp member having a first end, a second end, an inner surface, and an outer surface;
        wherein the first end of the first clamp member is connected to the first end of the second clamp member via a hinged engagement;
        wherein the second end of the first clamp member is capable of movement relative to the second end of the second clamp member when at least one of the first clamp member and the second clamp member is rotated about the hinged engagement; and
        wherein a volume of space between the inner surface of the first clamp member and the inner surface of the second clamp member defines a gap having a central axis, the central axis running parallel with an axis of rotation for the hinged engagement;
    a spatial adjustment mechanism, comprising:
        a first frame extending from the outer surface of the first clamp member, a second frame extending from the outer surface of the first clamp member, a third frame extending from the outer surface of the second clamp member, and a fourth frame extending from the outer surface of the second clamp member;
        a first spindle in mechanical engagement with the first frame, a second spindle in mechanical engagement with the second frame, a third spindle in mechanical engagement with the third frame, a fourth spindle in mechanical engagement with the fourth frame; and
        each of the first spindle, the second spindle, the third spindle, and the fourth spindle is capable of movement that is at least one of radially inward towards the central axis of the gap and radially outward from the central axis of the gap;
    a locking mechanism disposed on at least one of the second end of the first clamp member and the second end of the second clamp member, the locking mechanism configured to selectively arrest movement of the first clamp member relative to the second clamp member; and wherein an exposed area is formed between the clamping structure and the spatial adjustment mechanism, the exposed area forming a weld-access point.

11. The clamping device recited in claim 10, wherein:
the first frame comprises an extender portion extending from the outer surface of the first clamp member and a spindle support portion extending from the extender portion of the first frame;
the second frame comprises an extender portion extending from the outer surface of the first clamp member and a spindle support portion extending from the extender portion of the second frame;
the third frame comprises an extender portion extending from the outer surface of the second clamp member and a spindle support portion extending from the extender portion of the third frame; and
the fourth frame comprises an extender portion extending from the outer surface of the second clamp member and a spindle support portion extending from the extender portion of the fourth frame.

12. The clamping device recited in claim 11, wherein:
the extender portion of the first frame extends at a 90-degree angle from the outer surface of the first clamp member and the spindle support portion of the first frame extends at a 90-degree angle from the extender portion of the first frame;
the extender portion of the second frame extends at a 90-degree angle from the outer surface of the first clamp member and the spindle support portion of the second frame extends at a 90-degree angle from the extender portion of the second frame;
the extender portion of the third frame extends at a 90-degree angle from the outer surface of the second clamp member and the spindle support portion of the third frame extends at a 90-degree angle from the extender portion of the third frame; and
the extender portion of the fourth frame extends at a 90-degree angle from the outer surface of the second clamp member and the spindle support portion of the fourth frame extends at a 90-degree angle from the extender portion of the fourth frame.

13. The clamping device recited in claim 10, wherein each of the first spindle mechanical engagement, the second spindle mechanical engagement, the third spindle mechanical engagement, and the fourth spindle mechanical engagement is configured to facilitate movement of the first spindle, the second spindle, the third spindle, and the fourth spindle independently of each other.

14. The clamping device recited in claim 10, wherein each of the first frame, the second frame, the third frame, and the fourth frame is spaced equidistant from each other.

15. The clamping device recited in claim 10, wherein the locking mechanism comprises:
a latch disposed on the second end of the first clamp member;
a bolt disposed on the second end of the second clamp member; and
wherein the bolt configured to engage the latch.

16. The clamping device recited in claim 10, wherein each hinged engagement is a barrel-type hinge.

17. A method of securing a first pipe relative to a second pipe, the method comprising:
securing the clamping structure of the clamping device of claim 1 about at least a portion of the first pipe;
securing the spatial adjustment mechanism of the clamping device of claim 1 about at least a portion of the second pipe;
aligning a distal end of the first pipe with a distal end of the second pipe by adjusting the spatial adjustment mechanism, the aligning comprising the distal end of the first pipe extending coaxially with, or at an angle relative to, the distal end of the second pipe;
welding the distal end of the first pipe to the distal end of the second pipe via the weld-access point.

18. The method of claim 17, wherein the securing the clamping structure further comprises advancing each clamp member circumferentially inward to reduce the gap so that at least a portion of each inner surface of each clamp member makes contact with at least a portion of the first pipe.

19. The method of claim 17, wherein the securing the spatial adjustment mechanism further comprises advancing the spindle radially inward so that at least a portion of the spindle makes contact with at least a portion of the second pipe.

20. The method of claim 17, wherein the aligning further comprises the distal end of the first pipe and the distal end of the second pipe abutting each other at a location that lies between the clamping structure and the spatial adjustment mechanism.

* * * * *